April 16, 1963  G. C. FIELDS  3,085,445
DRIVE MECHANISM

Filed Dec. 5, 1960  3 Sheets-Sheet 1

INVENTOR.
GEORGE C. FIELDS
BY
Harry W. Hargis III
AGENT

April 16, 1963 G. C. FIELDS 3,085,445
DRIVE MECHANISM
Filed Dec. 5, 1960 3 Sheets-Sheet 2
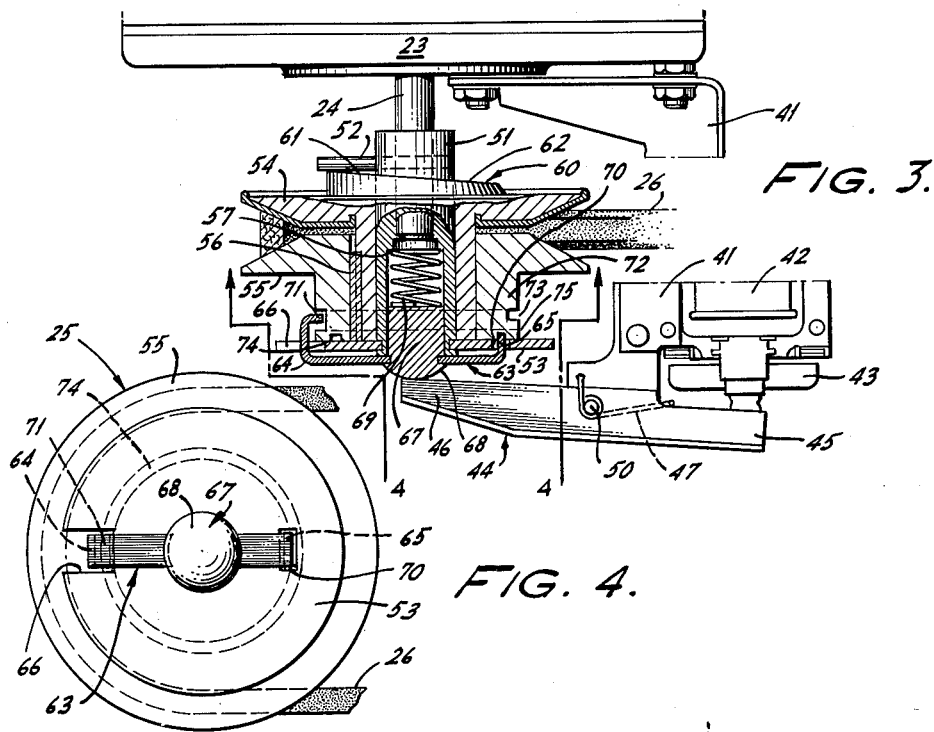
FIG. 3.
FIG. 4.
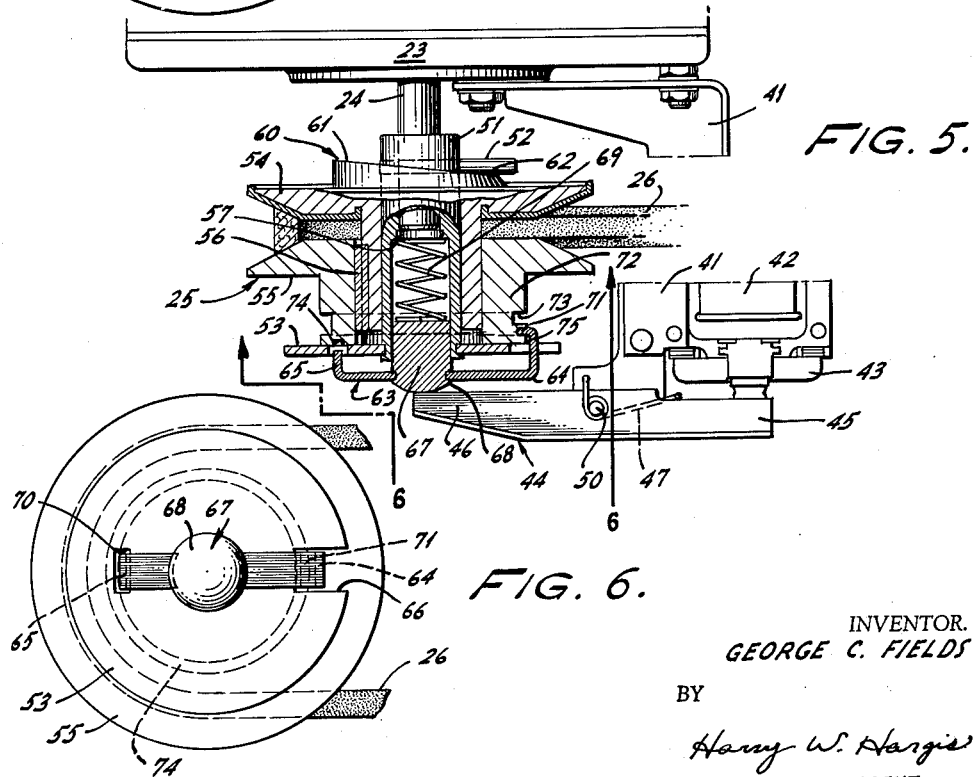
FIG. 5.
FIG. 6.
INVENTOR.
GEORGE C. FIELDS
BY
Harry W. Hargis III
AGENT

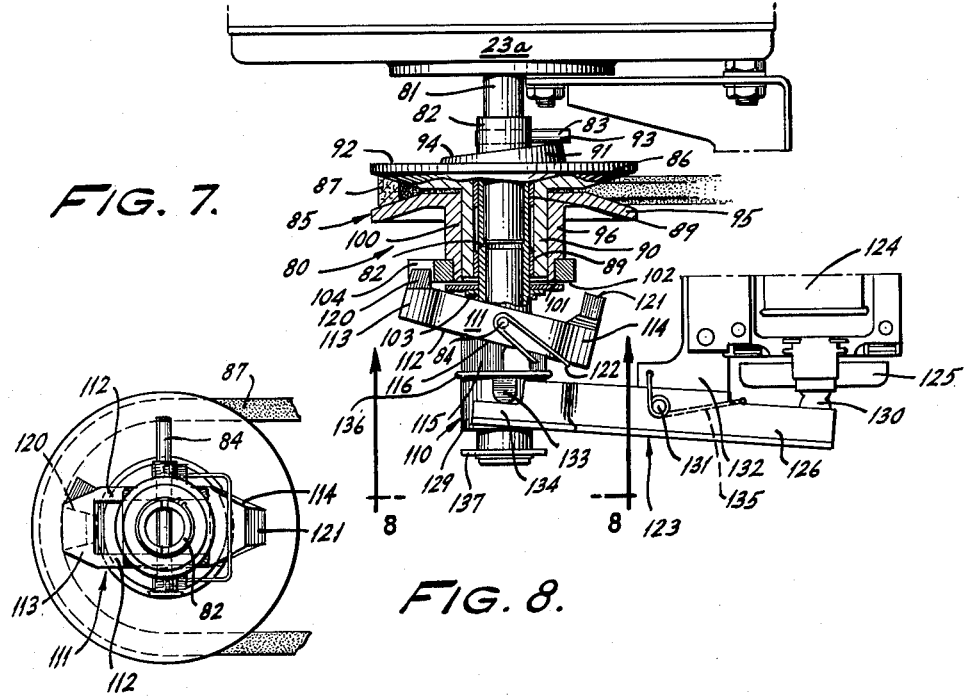
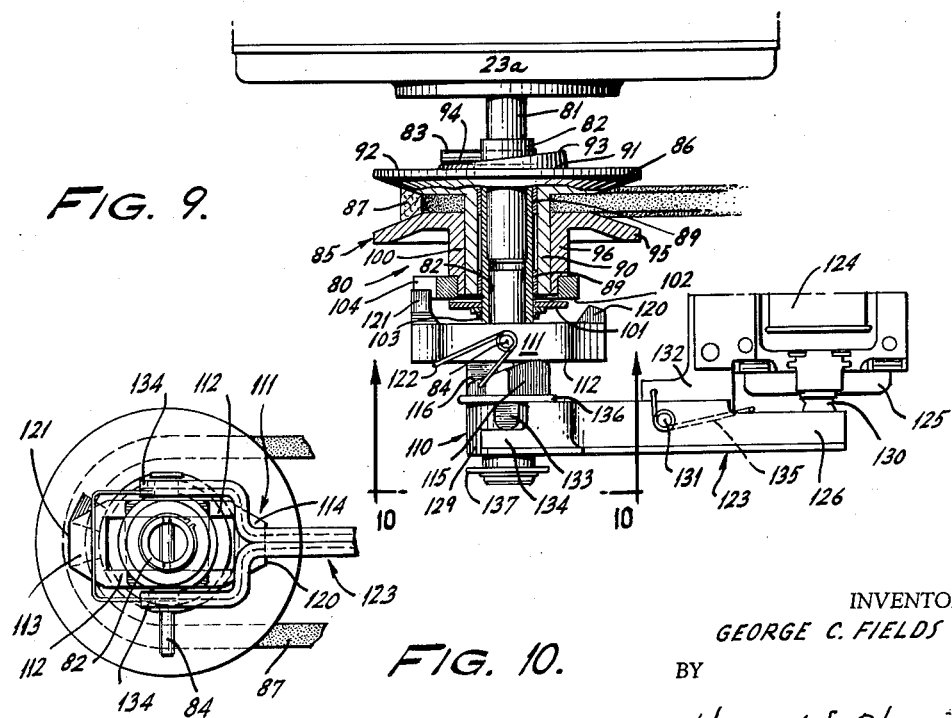

United States Patent Office 3,085,445
Patented Apr. 16, 1963

3,085,445
DRIVE MECHANISM
George C. Fields, Wilmette, Ill., assignor, by mesne assignments, to Philco Corporation, Philadelphia, Pa., a corporation of Delaware
Filed Dec. 5, 1960, Ser. No. 73,848
8 Claims. (Cl. 74—230.17)

The present invention relates to drive mechanisms, and more particularly to multi-speed transmission assemblies.

While of broader applicability, apparatus of the present invention is particularly adapted for driving laundry apparatus such for example as domestic washing machines.

Apparatus of the foregoing type normally is driven at low agitating speeds to force washing fluid through fabrics being laundered, and is driven at accelerated centrifuging speeds to remove washing fluid from the fabrics. When washing certain synthetic fabrics, such for example as Orlon and nylon, it has been found desirable to operate at lower agitating and centrifuging speeds than normally are required for regular fabrics such as cotton and linen.

It is therefore an object of the invention to provide a drive mechanism for laundry apparatus affording selection of different agitating and centrifuging speeds.

It is also an object of the invention to provide a simple and effective variable speed transmission.

It is another object of the invention to provide speed changing mechanism for a belt drive and featured by substantially self actuating linkage means.

In achievement of the foregoing and other objectives the invention contemplates—as illustrated by way of example in a laundry machine—power transmission apparatus comprising a belt pulley formed in two sections connected for rotation together on a rotatable shaft. One of the two pulley sections is movable along the pulley and shaft axis to vary the effective diameter of the pulley, and cam means is provided comprising a cam surface on the movable pulley section and a cam follower rotatable with the shaft relative to the pulley sections. This cam means is operable to provide for selective axial movement of the movable pulley section toward and away from the other pulley section in response to predetermined increments of angular movement imparted to the rotatable shaft. Lost motion coupling means is disposed and adapted releasably to couple the said other section of the driving pulley to the rotatable shaft to rotate the pulley sections as a unit. The lost motion coupling provides a predetermined angular movement of the shaft and cam follower relative to the pulley sections to achieve the speed changing axial movement of the movable pulley section. Preferably, the lost motion coupling means is so arranged as to permit 180° rotation of the shaft and cam follower in providing for axial movement of the movable pulley section.

A power transmitting belt is so tensioned over the pulley as to maintain close driving engagement with the pulley for each axial position of the movable pulley section, and it is a feature of the invention that the power required to increase the effective diameter of the pulley, by moving the movable section against the tension of the belt, is derived from energy applied to the shaft to rotate the same and applied through the cam follower to the movable pully section.

The manner in which the foregoing as well as other objects and advantages of the invention may best be achieved will be understood upon consideration of the following description, taken in conjunction with the accompanying drawing in which:

FIGURE 3 is a somewhat enlarged elevational showing, partly in section and with parts broken away, of the split pulley drive and actuator mechanism seen also in FIGURE 2, conditioned for high speed drive;

FIGURE 4 is a view of apparatus shown in FIGURE 3 taken in the direction of arrows 4—4 applied thereto;

FIGURE 5 is a showing, similar to FIGURE 3, of the mechanism conditioned for low speed drive;

FIGURE 6 is a view of apparatus shown in FIGURE 5 taken in the direction of arrows 6—6 applied thereto;

FIGURE 7 is a view similar to FIGURE 3, but showing a modified embodiment of the invention;

FIGURE 8 is a view of apparatus shown in FIGURE 7 taken generally in the direction of arrows 8—8 applied thereto;

FIGURE 9 is a view similar to FIGURE 7, but showing an operational feature of the modified embodiment; and FIGURE 10 is a view of apparatus shown in FIGURE 9 taken in the direction of arrows 10—10 applied thereto.

Figure 1:
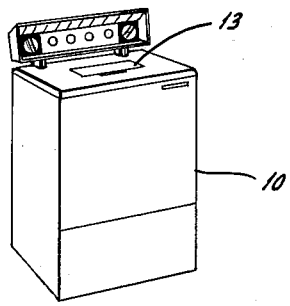
FIGURE 1 is a perspective showing of laundry apparatus embodying the invention.
Figure 2:
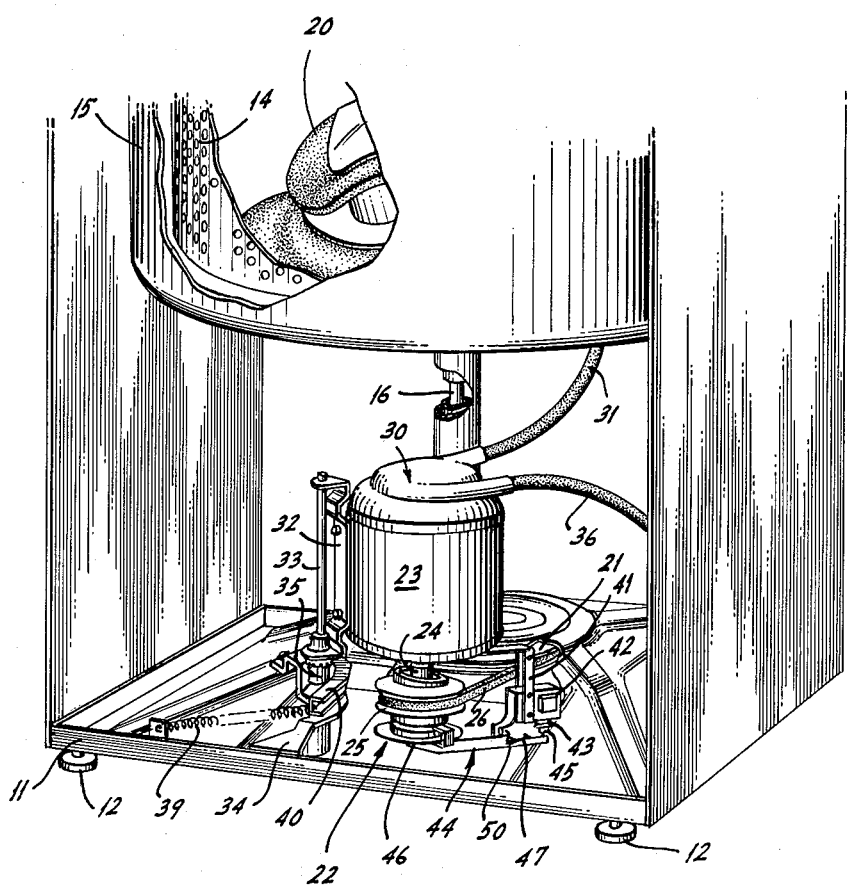
FIGURE 2 is a perspective showing, with parts either removed or broken away, of the apparatus shown in FIGURE 1 and as viewed from the front.

Now making more particular reference to the drawings, and first to FIGURES 1 and 2, a washing machine embodying the present invention includes an outer cabinet 10 supported upon a base member 11 provided with conventional levelling feet 12 (FIGURE 2). A door 13 disposed in the upper horizontal wall of cabinet 10 provides access to an upwardly presented rotatable basket 14 which is nested within and spaced from an outer tub 15 mounted within cabinet 10. A drive shaft 16 extends through the bottom portions of the tub and basket, and the upper shaft portion (not shown) is disposed within rotatable basket 14, while the lower shaft portion (not shown) is disposed below base member 11. The upper shaft portion drives a wobble plate agitator 20 when shaft 16 is driven in one direction, and basket 14 is locked to and rotated with the agitator when the shaft is driven in the opposite direction. While a detailed description of clutch apparatus providing for this mode of operation, as well as additional structural features of the agitator and rotatable tub, is not necessary to an understanding of the present invention, reference may be had, for a description of such apparatus and by way of example, to U.S. Patent No. 2,924,086 of George C. Fields, issued February 9, 1960 and assigned to the assignee of the present invention.

A pulley 21 (see FIGURE 2) is affixed to the lower portion of shaft 16 and imparts the desired rotational movements to the shaft under the actuation of the novel drive mechanism to be hereinafter fully described.

In particular accordance with the invention a transmission means 22 is driven by a motor 23 disposed and adapted to drive pulley 21 at different agitating and centrifuging speeds and includes a variable groove split pulley 25, carried by the motor shaft 24, and a drive belt 26 encircling the groove portions of pulley 21 and split pulley 25. Motor 23 is of the constant speed type and is reversible, selectively to provide forward or reverse drive of pulley 21.

A wash-fluid drain pump 30 is mounted upon the upper end of motor 23 and is adapted to be driven by the upper end (not shown) of motor shaft 24. Pump 30 is disposed in fluid flow communication with flexible hose means 31, extending into like communication with the stationary outer tub 15, and discharge hose means 36.

Motor 23 is pivotally supported by a bracket 32 upon a vertically extending pin 33 mounted upon base 11 through the agency of a bracket 34. Vertical support of motor 23, as well as proper elevation thereof to ensure proper belt and pulley alignment, is provided by an adjustably positioned thrust member 35 supported upon vertical pin 33 and disposed in abutting engagement with motor bracket 32.

An arm 40, preferably a channel member, extends away from motor bracket 32 and is connected to base member 11 by a spring 39 that exerts a pivotal force upon motor 23 through arm 40 and about the vertical pin 33. This pivotal force tends to displace the motor shaft 24 transversely to provide appropriate tensioning of drive belt 26 over the pulleys 21 and 25, and to compensate for variations in the diameter of pulley 25 as hereinafter described.

A bracket 41 is mounted upon the lower portion of motor 23 and has an electrical solenoid device 42 attached thereto. Solenoid device 42 includes a plunger 43 that is reciprocably movable vertically between an upper and a lower position in response respectively, to energization and deenergization of the device by suitable means not shown. Plunger 43 is connected to a free end 45 of a lever arm 44 pivotally mounted, as seen at 50 intermediate its ends to a suitably arranged, extended portion of bracket 41. The other free end 46 of lever arm 44 operatively engages, under the urging of spring 47 reacting between the arm and bracket 41, the shifting mechanism of split driving pulley 25 as will be hereinafter fully described.

Referring now with particularity to FIGURES 3 to 6, the split driving pulley 25 comprises an extension sleeve 51 affixed to motor shaft 24 by a pin 52. A drive plate 53 is affixed to the outer end of sleeve 51, and shaft 24, sleeve 51, and plate 53 are thus rotatable as a unit. A first half 54 of split pulley 25 is both rotatable and axially slidable relative to the sleeve 51. The other half 55 of split pulley 25 is keyed by means 56 to first pulley half 54 for rotation therewith and for axial sliding movements relative thereto. Pulley half 54 therefore is movable axially as respects pulley half 55, the latter being restrained from moving axially by the plate 53 on one hand and the tensioned belt 26 on the other. First pulley half 54 has a double-helical cam 60 presented axially of the pulley 25 and provided with respective higher and lower surface portions 61 and 62. These surface portions 61 and 62 of the cam are slidably engageable by pin 52, as a cam follower, to provide for the axial movement of the movable pulley half 55 in response to a predetermined increment of angular movement imparted to the motor shaft 24.

Means for conditioning pulley 25 for shifting between high and low speed drives, by varying its effective groove diameter, comprises an arm 63 provided with a plunger portion 67 disposed within sleeve 51. A spring 69 disposed between an internal shoulder 57 of sleeve 51 and plunger portion 67 resiliently urges a rounded end 68 of the latter against end portion 46 of the pivotally mounted lever 44. Lever 44 is operatively linked to plunger 43 of solenoid device 42 which, when selectively energized (FIGURE 5), overcomes the force of spring 47 upon lever 44 and moves end 46 thereof away from end 68 of arm plunger portion 67 to accommodate extension of the plunger by its spring 69 to the position seen in FIGURE 5. Conversely, selective deenergization of the solenoid device (FIGURE 3) permits movement of arm 44, under the urging of spring 47 to the position shown in FIGURE 3, in which position the plunger portion 67 is urged upwardly against its spring 69 to the position shown.

It is further seen that arm 63 has upwardly turned end portions 64 and 65 that extend, respectively, through apertures 66 and 70 (FIGURES 4 and 6) provided in drive plate 53. Arm 63 is rotatably driven by plate 53, rotation producing moments of force being transmitted to arm 63 through the bent up portions 64 and 65 thereof by edge portions of the apertures 66 and 70 of drive plate 53. The left hand upwardly turned end portion 64 (as viewed in FIGURES 3 and 4) further includes another turned portion 71 presented radially inwardly. The hub portion 72 of pulley half 55 is provided with a radially presented groove 73 and an axially presented groove 74.

The upwardly turned arm portion 65 is movable into and out of the axially presented groove 74, upon actuation of the plunger portion 67.

When this arm portion 65 is in the groove 74, as is the case for the position of arm 63 shown in FIGURES 3 and 4, it is movable into the illustrated driving engagement with suitably disposed stop means 75 on the pulley hub portion 72, in response to rotation of shaft 24 by motor 23.

Simultaneous with the aforesaid axial movements of end portion 65 of arm 63, the other end portion 71 is movable, axially of the pulley, within the radially presented groove 73 in pulley hub portion 72, groove 73 being of sufficient width to permit the required degree of axial movements of plunger 67. When arm end portion 71 is moved to the lower portion of its groove 73, as shown in FIGURES 5 and 6, it is rotatably movable within the groove into the illustrated driving engagement with the stop means 75 on hub portion 72.

Note, therefore, that when either of opposite end portions 65 or 71 of shifter arm 63 is disengaged from the stop means 75 the arm rotates unidirectionally through approximately 180° and the other end portion of the arm is moved into driving engagement with stop means 75. Importantly, as arm 63 is driven through this predetermined angular increment, cam follower pin 52 is driven through the same increment either onto the higher cam surface 61 (FIGURE 3), to move the first pulley half 54 toward the other half 55 for high speed drive or onto the lower cam surface 62 (FIGURE 5), to accommodate movement of the first pulley half 54 away from the other half 55 for low speed drive. When changing from high speed drive (FIGURE 3) to low speed drive (FIGURE 5), the force required relatively to spread the pulley halves apart, thereby to decrease the effective pulley diameter, is provided by the belt tension as derived from tensioning means comprising arm 40 and spring 41. When changing from low speed (FIGURE 5) to high speed (FIGURE 3), the force required relatively to move the pulley halves together against the belt tension thereby to increase the effective pulley diameter, is derived from the motor torque as transmitted through cam follower pin 52 to the higher cam surface portion 61 of pulley half 54.

It will therefore be appreciated that the solenoid device need only exert sufficient force to condition the pulley for shifting from one speed to another, the shifting force being derived from a combination of the motor torque and forces exerted by the belt tensioning means. By virtue of the foregoing arrangement there is provided a simple and effective variable speed transmission that is substantially self actuated in achievement of the speed changing function, actuation being initiated by selective indexing of the drive coupling between a pulley and a driving shaft.

Referring now with particularity to FIGURES 7 to 10 wherein there is illustrated a modified embodiment of the invention, a driving pulley mechanism 80 comprises an extension sleeve 82 affixed to the shaft 81 of a motor 23a. Sleeve 82 is keyed to the shaft 81 by a pin 83. Another pin 84 extends through sleeve 82 and is spaced from pin 83 along the axis of shaft 81, each of pins 83 and 84 extending in individual planes disposed at right angles to one another. Mechanism 80 further comprises a pulley 85 having a first half 86 journalled to shaft sleeve 82 by bearing means 89 disposed within pulley sleeve portion 90, pulley half 86 also being slidable along the axis of shaft sleeve 82. As in the previously described embodiment, a helical cam 91 extends along the outer face or hub portion 92 of pulley half 86, and includes a high surface portion 93 and a low surface portion 94, surface portions 93, 94 of cam 91 being engageable by the pin 83 as a cam follower. A second half 95 of pulley 85 has a sleeve portion 96 coextensive with the sleeve portion 90 of the other pulley half 86 and slidably connected thereto by means of suitable spline means (not shown).

Washers 101 are held in abutting engagement with the face 102 of sleeve portion 96 of pulley half 95 by means of a snap ring 103 to prevent substantial axial movement of pulley half 95 along shaft sleeve 82. A stop 104 is provided adjacent the face 102 of the substantially fixed pulley half 95 and extends generally radially from the sleeve portion 96 thereof.

A shifter hub assembly 110 forms a portion of the pulley-diameter changing linkage and includes an arm 111 made up of a pair of spaced intermediate sections 112 (see FIGURES 8 and 10) disposed astride shaft sleeve 82 and mounted upon pin 84 for pivotal movements between the positions shown in FIGURES 7 and 9. Sections 112 of arm 111 converge into opposite end portions 113 and 114. Pivotal movement of the arm 111 is effected by a sleeve 115 rotatable with, but slidably movable along, shaft extension 82 and having a pair of angular face portions 116 movable into (FIGURE 7) and out of (FIGURE 9) frontal engagement with sections 112 of pivotal arm 111 to provide the required positioning of the arm for achieving the speed shifting function as will be hereinafter more fully explained. Arm 111 includes a stop member 120 disposed at end portion 113 thereof and a stop member 121 disposed at end portion 114 of the arm, each of the stop members 120, 121 being presented generally axially and toward the fixed pulley half 95. A spring 122 reacts between the shifter arm 111 and the sleeve 115 as shown pivotally to urge arm 111 and slidably to urge sleeve 115 to the positions shown in FIGURES 9 and 10.

The construction and arrangement of the respective shifter arm and pulley stop members 120, 121 and 104 are such that in the arm position of FIGURES 7 and 8 stops 120 and 104 are disposed to interengage as shown, each such interengagement being preceded by approximately 180° of rotation of the motor shaft 81 relative to the pulley. It is the above described interengagement of these stops, in the present embodiment, that provides the driving connection between motor shaft 81 and the pulley 85.

Movement of sleeve 115 to the position shown in FIGURE 7 is achieved by operation of an electrical solenoid-actuated linkage means 123 comprising a selectively energizable solenoid coil 124 having a plunger 125 operative thereby and connected as seen at 130 to a lever arm 126. Arm 126 is pivotally mounted at 131 to a bracket 132 affixed to the motor, and solenoid coil 124 is also mounted to the bracket 132.

A sleeve 129 is slidable along but not rotatable with shaft extension 82. A washer 136 is disposed between, and in abutting relation to, adjacent faces of sleeves 115 and 129, and permits relative rotative movement therebetween while providing for concurrent axial movements thereof. Flange 137 on the lower end of shaft extension 82 prevents accidental removal of sleeves 129 and 114 in the event lever 126 is released from engagement with the former, said flange also ensuring maintenance of the unitary assembly of the shifter arm and sleeve elements. A spring 135 is positioned and adapted to react between bracket 132 and lever arm 126 to urge bifurcations 134 (note FIGURE 10) of the latter against ears 133 to maintain the above mentioned frictional engagement. When the solenoid coil 124 is deenergized, its plunger 125 assumes the extended position, as seen in FIGURE 7, under the force of spring 135 against lever 126, which force overcomes the relatively weaker opposing force exerted against the lever by spring 122 acting through sleeve 115, washer 136, and sleeve 129. Therefore, when the solenoid coil 124 is energized (FIGURE 9) it need only exert sufficient force to overcome a difference in forces exerted by springs 122 and 135, actuation of arm 111 being effected by spring 122 as the faces 116 of shifter sleeve 115 move away from arm 111.

The speed changing function is therefore achieved by effecting pivotal and rotational movements of arm 111 between the positions shown in FIGURES 7–8 and 9–10. For example, assuming the arm 111 to be in the high speed driving position shown in FIGURES 7 and 8, movement of the arm 111 to the position shown in FIGURES 9 and 10 is brought about by pivoting the arm about pin 84 then rotating the same through approximately 180° with motor shaft 81. Pivoting of the arm moves stop member 120 out of engagement with pulley stop 104, and rotation of the shaft moves the pivoted arm substantially end for end to the position shown in FIGURES 9 and 10, wherein stop 121 is aligned with and engages pulley stop 104. This allows the approximately 180° of shaft movement relative to the pulley to achieve the pulley splitting action which results when cam follower 83 moves from higher surface 93 of cam 91 to its lower surface 94, permitting the belt 87 to split the pulley as shown.

Conversely, assuming the elements to be in the low speed driving positions shown in FIGURES 9 and 10, deenergizing solenoid 124 permits spring 135 to move lever 126 to the position shown in FIGURE 7. In so moving, end portion 134 of the lever moves sleeve 129, washer 136, and sleeve 115 upwardly, and angular face portions 116 of the latter cause the arm 111 to pivot whereby to move stop member 121 out of and member 120 into the path of pulley stop 104. Rotation of shaft extension 82 at this time turns the arm 111 substantially end-for-end and member 120 engages stop 104. During this increment of angular movement cam follower 83 is moved onto the higher cam surface portion 93, forcing pulley section 86 downwardly and belt 87 relatively outwardly to the effective greater pulley diameter as shown in FIGURES 7 and 8. Note that relative outward movement of the belts of either embodiment of the invention is accommodated by a slight pivoting of the motor against the force of the belt tensioning spring.

I claim:

1. A variable speed power transmission apparatus comprising: means defining a pulley mounted on a rotatable shaft and including a pair of sections cooperative to form a variable groove, said sections being angularly movable with respect to said shaft and one of said sections being movable axially toward and away from the other of said sections to vary the groove; lost motion coupling means for coupling said shaft to said pulley and including selectively operable actuator means operatively associated therewith to provide one of at least a pair of predetermined incremental relative angular movements between said shaft and said pulley; and means for effecting the recited axial movement of the one pulley section including a first cam element on said one pulley section and a second cam element mating with said first cam element and driven with said shaft, the said cam elements being cooperable in response to selective actuation of said lost motion coupling means to move said one pulley section.

2. Variable speed power transmission apparatus comprising: means defining a pulley mounted on a rotatable shaft and including a pair of sections cooperative to form a groove of variable depth, said sections being angularly movable with respect to said shaft and one of said sections being movable axially toward and away from the other of said sections to vary the depth of the groove; lost motion coupling means for coupling said shaft to said pulley and including selectively operable actuator means operatively associated therewith to provide one of at least a pair of predetermined incremental relative angular movements between said shaft and said pulley; and means for effecting the recited axial movement of the one pulley section including a cam surface on said one pulley section and a cam follower driven with said shaft, the said follower being operable in response to selective actuation of said lost motion coupling means to cooperate with said cam surface to move said one pulley section.

3. Apparatus in accordance with claim 2 wherein said lost motion coupling means comprises: an actuator arm extending transversely of said shaft and drivingly coupled thereto, said arm including stop portions disposed at opposite ends thereof and selectively movable toward and away from said other pulley section; stop means on said other pulley section disposed and adapted to be engaged selectively by one and disengaged by the other of said arm stop portions to effect end for end rotation of said arm and provide the last motion for operation of said cam follower.

4. Apparatus in accordance with claim 3, and further including a solenoid device operatively coupled with said actuator arm to provide for movement of the stop portions thereof toward and away from said stop means on said other pulley section.

5. In combination with a single speed motor, shaft means driven with said motor and a shaft to be driven at a plurality of speeds by said motor shaft means, variable speed power transmission means providing a driving connection between said motor shaft means and said shaft, comprising: a first pulley carried by said shaft and adapted to drive the same; a second pulley carried by said shaft means and disposed and adapted to be driven with said motor, including a pair of sections relatively movable along the pulley axis to vary the effective diameter of said second pulley; lost motion coupling means drivingly connected with said shaft means and providing the driving connection for said second pulley through one of its sections; a driving belt engaging said pulleys; cam means including a cam surface on the other section of said second pulley and a cam follower driven with said lost motion coupling means, said cam surface and follower being cooperative in response to actuation of said lost motion coupling means to provide for axial movement of said second pulley section relative to the first; means for selectively actuating said lost motion coupling means to provide for axial movement of said second pulley section and means for tensioning said belt to accommodate drive thereof at the effective diameter of said second pulley.

6. Drive mechanism comprising: a driving pulley and a driven pulley, one of said pulleys being formed in two sections having belt groove forming faces and connected for rotation together, one of said sections being movable along the pulley axis to vary the effective diameter of the pulley; cam means including a cam surface on the said one movable pulley section and a cam follower adapted for angular movements about the pulley axis and relative to said pulley sections, said cam means being operable to provide for selective axial movement of said one pulley section toward and away from the other of said sections in response to a predetermined increment of angular movement imparted to said cam follower; a driving belt engaging said pulleys; lost motion coupling means disposed and adapted to releasably couple the said other section of the driving pulley to a source of energy to drive the driving pulley, the lost motion coupling being so operatively associated with said cam follower as to provide said predetermined angular movement of said cam follower to cause the said axial movement of the one pulley section; means for selectively actuating said lost motion coupling means to provide for variation in the effective diameter of the driving pulley; and belt tensioning means operative to maintain such driving engagement of said belt with said driving pulley as to accommodate the axial position of said one pulley section.

7. Variable speed power transmission apparatus, comprising: a pulley mounted on a rotatable shaft and including a pair of sections cooperative to form a variable groove, said sections being keyed together for relative axial movements as respects one another to vary the groove, said sections being angularly movable together as respects said shaft, one of said sections having a hub portion provided with a stop element, and the other of said sections having a hub portion provided with a cam; a cam follower for said cam driven with said shaft and cooperable with said cam to effect axial movement of said other pulley section relative to the said one section in response to rotation of said shaft; an arm disposed adjacent said one pulley section hub, extending transversely of said shaft, and coupled to the latter for rotatable movements therewith, said arm further being mounted for reciprocable movements axially of said shaft, toward and away from said one pulley hub portion, the opposite ends of said arm being provided with stop means releasably engageable with the stop element of said hub portion to provide a driving connection between said shaft and said pulley, one stop means being engageable with the stop element when the arm is in one of its axial positions and the other stop means being thus engageable when the arm is in the other of its axial positions, changing of the axial position of the arm thereby accommodating relative rotatable movements between the shaft and the pulley to actuate the said cam; and means for selectively moving said arm either toward or away from said pulley.

8. Variable speed power transmission apparatus comprising: a belt pulley mounted on a rotatable shaft and including a pair of sections cooperative to form a variable belt groove, said sections being angularly movable with respect to said shaft and one of said sections being keyed to the other for axial movements toward and away from the other of said sections to vary the groove, said other section having a hub portion provided with an axially presented groove, a radially presented groove, and a stop element adjacent thereto; a drive plate affixed to the outer end of the shaft adjacent said pulley means and having a pair of radially spaced apertures therein; a double-helical cam surface carried by the said one pulley section and presented axially of the pulley and including respective higher and lower surface portions; a cam follower projecting from the shaft and engageable with said cam surface, said cam surface and cam follower being cooperative to provide for axial movement of the movable pulley section in response to a predetermined increment of angular movement imparted to the shaft relative to the pulley; an arm extending transversely of said shaft and mounted for reciprocable movements axially as respects the shaft, said arm having transversely turned end portions extending through said apertures provided in said drive plate and engageable by the latter rotatably to be driven thereby, one of said transversely turned end portions including a turned portion presented radially inwardly toward the shaft, the transversely turned arm portion being movable, upon axial movements of said arm, into and out of the axially presented groove provided in the other pulley section, whereby it is movable respectively into and out of driving engagement with said stop element provided on the said pulley hub portion in response to rotation of the shaft by the motor, the other end portion of the arm being simultaneously movable within the said radially presented groove in the said pulley hub portion, such engagement and disengagement providing for rotation of the shaft relative to the pulley through a predetermined angular increment to provide for movement of the cam follower either onto or off of the higher cam surface to provide for movement of one pulley section relative to the other.

References Cited in the file of this patent
UNITED STATES PATENTS

| | | |
|---|---|---|
| 1,174,920 | Wilson et al. | Mar. 7, 1916 |
| 2,099,359 | Woodeson et al. | Nov. 16, 1937 |
| 2,297,694 | Dunham | Oct. 6, 1942 |
| 2,651,208 | Karig | Sept. 8, 1953 |
| 2,900,834 | Bessette | Aug. 25, 1959 |